United States Patent
Zi et al.

(10) Patent No.: US 10,916,222 B2
(45) Date of Patent: Feb. 9, 2021

(54) METHOD, APPARATUS, AND VIRTUAL REALITY DEVICE FOR DISPLAYING VIRTUAL REALITY SCENE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Feng Zi, Beijing (CN); Jian Sun, Beijing (CN); Ziqiang Guo, Beijing (CN); Binhua Sun, Beijing (CN); Feng Pan, Beijing (CN); Yakun Wang, Beijing (CN); Jiyang Shao, Beijing (CN); Xinjian Liu, Beijing (CN); Bingxin Liu, Beijing (CN); Hao Zhang, Beijing (CN); Lili Chen, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/519,194

(22) Filed: Jul. 23, 2019

(65) Prior Publication Data

US 2020/0211510 A1 Jul. 2, 2020

(30) Foreign Application Priority Data

Jan. 2, 2019 (CN) .......................... 2019 1 0001311

(51) Int. Cl.
*G09G 5/36* (2006.01)
*G06F 3/01* (2006.01)
*G06T 1/60* (2006.01)

(52) U.S. Cl.
CPC ............... *G09G 5/36* (2013.01); *G06F 3/011* (2013.01); *G06T 1/60* (2013.01); *G09G 2354/00* (2013.01)

(58) Field of Classification Search
CPC ...... G09G 5/36; G09G 2354/00; G06F 3/011; G06T 1/60
See application file for complete search history.

(56) References Cited

U.S. PATENT DOCUMENTS

2017/0109936 A1* 4/2017 Powderly .............. G06F 3/0482

FOREIGN PATENT DOCUMENTS

| CN | 103559713 | 2/2014 |
|----|-----------|--------|
| CN | 107274469 | 10/2017 |
| CN | 107797741 | 3/2018 |
| CN | 108234049 | 6/2018 |

OTHER PUBLICATIONS

First Office Action for CN Appl. No. 201910001311.2, dated Dec. 11, 2019, 16 pages.

\* cited by examiner

*Primary Examiner* — Andrew Sasinowski
(74) *Attorney, Agent, or Firm* — The Webb Law Firm

(57) ABSTRACT

The present disclosure provides a method, an apparatus, and a virtual reality device for displaying a virtual reality scene. The method comprises: acquiring pose information of a user and transmitting the pose information to a target device; receiving static picture data corresponding to the pose information transmitted by the target device through a first transmission channel and storing the static picture data; and generating a display picture according to the static picture data and displaying the display picture.

13 Claims, 3 Drawing Sheets

METHOD, APPARATUS, AND VIRTUAL REALITY DEVICE FOR DISPLAYING VIRTUAL REALITY SCENE

CROSS-REFERENCE TO RELATED APPLICATIONS

This application claims the priority to Chinese Patent Application 201910001311.2, filed on Jan. 2, 2019, the content of which is incorporated herein by reference in its entirety for all purposes.

TECHNICAL FIELD

The present disclosure relates to a method, an apparatus, and a device for displaying a virtual reality scene.

BACKGROUND

Most of the virtual reality display technologies are based on image transmission. With the pursuit of high-definition picture quality, the amount of data transmission is also growing. Taking a splitter virtual reality as an example, a target device needs to transmit a large amount of image data to a virtual reality device. However, wired transmission has an advantage in bandwidth, but wires bring a poor experience, and wireless transmission has an advantage in experience.

At present, when a virtual reality device uses the wireless transmission, the picture resolution of virtual reality needs to be improved due to the limitation of wireless transmission bandwidth.

SUMMARY

According to a first aspect of the present disclosure, there is provided A method for displaying a virtual reality scene, comprising: acquiring pose information of a user and transmitting the pose information to a target device; receiving static picture data corresponding to the pose information transmitted by the target device through a first transmission channel and storing the static picture data; and generating a display picture according to the static picture data and displaying the display picture.

In an example, the method further comprises, after acquiring the pose information of the user: determining whether static picture data corresponding to the pose information has been stored according to the pose information; and if so, calling the static picture data, generating a display picture according to the static picture data and displaying the display picture; if not, receiving the static picture data corresponding to the pose information transmitted by the target device through the first transmission channel and storing the static picture data.

In an example, the method further comprises, before generating the display picture according to the static picture data and displaying the display picture: receiving dynamic picture data corresponding to the pose information transmitted by the target device through a second transmission channel; wherein the generating the display picture according to the static picture data and displaying the display picture comprises: generating the display picture according to the static picture data and the dynamic picture data and displaying the display picture.

In an example, the method further comprises, after receiving static picture data corresponding to the pose information transmitted by the target device through the first transmission channel: receiving other static picture data transmitted by the target device through the first transmission channel and storing other static picture data.

In an example, the method further comprises: acquiring a user operation instruction and transmitting the user operation instruction to the target device; receiving dynamic picture data corresponding to the user operation instruction through a second transmission channel; wherein the generating the display picture according to the static picture data and displaying the display picture comprises: generating the display picture according to the static picture data and the dynamic picture data and displaying the display picture.

In an example, the pose information comprises at least one of: the user's position, orientation, and or head elevation.

In another aspect of the present disclosure, there is provided an apparatus for displaying a virtual reality scene, comprising: a transmitter configured to acquire pose information of a user and transmit the pose information to a target device; a first receiver configured to receive static picture data corresponding to the pose information transmitted by the target device through a first transmission channel and store the static picture data; and a display configured to generate a display picture according to the static picture data and display the display picture.

In an example, the apparatus further comprises a second receiver configured to receive dynamic picture data corresponding to the pose information transmitted by the target device through a second transmission channel; wherein the display is configured to generate the display picture according to the static picture data and the dynamic picture data and display the display picture.

In an example, the apparatus further comprises a processor: wherein the processor is configured to: determine whether static picture data corresponding to the pose information has been stored according to the pose information; and if so, call the static picture data; if not, the first receiver is configured to receive static picture data corresponding to the pose information transmitted by the target device through the first transmission channel and store the static picture data.

In an example, the first receiver is further configured to: receive other static picture data transmitted by the target device through the first transmission channel and store other static picture data.

In an example, the transmitter is further configured to acquire a user operation instruction and transmit the user operation instruction to the target device; the second receiver is further configured to receive dynamic picture data corresponding to the user operation instruction through a second transmission channel; and the display is specifically configured to generate the display picture according to the static picture data and the dynamic picture data and display the display picture.

In an example, wherein the pose information comprises at least one of: the user's position, orientation, and or head elevation.

In yet another aspect of the present disclosure, there is provided a virtual reality device comprising the apparatus according to the above stated.

In still another aspect of the present disclosure, there is provided an electronic device, comprising: a memory that stores executable program codes; and a processor configured to run programs corresponding to the executable program codes stored in the memory by reading the executable program codes for implementing the method for displaying a virtual reality scene according to any of claims 1-5 claim 1.

In another aspect of the present disclosure, there is provided a non-transitory computer-readable storage medium having computer programs stored thereon which, when executed by a processor, implement the method according to the one state above.

Additional aspects and advantages of the present disclosure will be partly set forth in the following description, partly will be apparent from the following description, or from the practice of the present disclosure.

DETAILED DESCRIPTION

Figure 1:
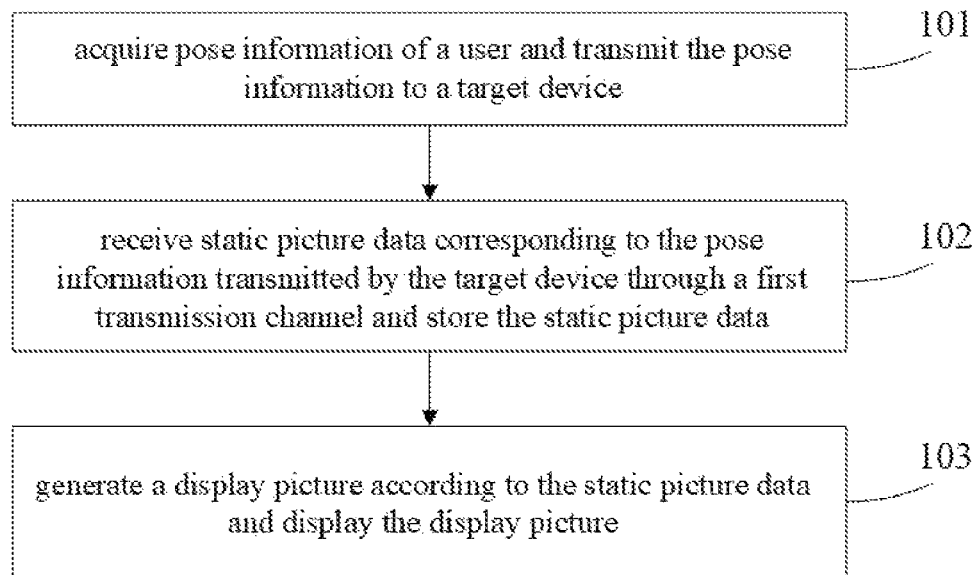
FIG. 1 is a schematic flow chart of a method for displaying a virtual reality scene provided by an embodiment of the present disclosure.

Embodiments of the present disclosure will be described below in detail, examples of which are showed in the drawings, wherein same or similar numerals represent same or similar elements or elements with same or similar functions throughout. The embodiments described below with reference to the drawings are exemplary and intended to illustrate the present disclosure, but can not be construed as limitations to the present disclosure.

A method, an apparatus and a device for displaying a virtual reality scene according to embodiments of the present disclosure are described below with reference to the drawings.

FIG. 1 is a schematic flow chart of a method for displaying a virtual reality scene provided by an embodiment of the present disclosure. As shown by FIG. 1, the method comprises the following steps.

At step 101, pose information of a user is acquired and transmitted to a target device.

The method may be performed by a virtual reality device. The virtual reality device may be, for example, a head-mounted virtual reality device and the like.

In the embodiment, it is required to acquire the pose information of the user when displaying the virtual reality scene.

As an example, the virtual reality device may detect the user's position and posture through related sensors such as geomagnetism, gyroscopes, and acceleration sensors. For example, it may be detected that the user is looking upward, looking downward or turning, turning left or the like. The virtual reality device generates the pose information of the user and transmits it to the target device. The pose information includes, but is not limited to, the user's position, orientation, head elevation, etc.

The virtual reality device may be a split virtual reality device or an integrated virtual reality device. When the virtual reality device is an integrated virtual reality device, the target device may be included in the virtual reality device.

In an example, the target device includes, but is not limited to, data processing devices such as personal computer and the like.

At step 102, static picture data corresponding to the pose information transmitted by the target device is received through a first transmission channel and stored.

In an embodiment of the present disclosure, the target device may store a correspondence between the pose information and the static picture data in advance. For example, the virtual reality scene is a forest, pose information A when the user looks forward corresponds to static picture data of trees, pose information B when the user looks left corresponds to static picture data of a lawn. The target device receives the pose information transmitted by the virtual reality device, acquires corresponding static picture data according to the pose information and the corresponding relation, and transmits the static picture data to the virtual reality device through the first transmission channel. The virtual reality device receives the static picture data and stores it locally, and stores the corresponding pose information.

Many approaches may be used to transmit the static picture data through the first transmission channel.

As an example, the target device acquires the static picture data and transmits a frame of the static picture data through the first transmission channel.

As another example, the target device acquires the static picture data and transmits the static picture data through the first transmission channel at a preset time.

It should be noted that, a static picture may be a static background, a static object, etc., such as a static tree, or may be a periodically moving object, such as a pendulum that periodically swings left and right, and the pendulum completes one round of swing every N frames, then the Nth frame is regarded as a static picture.

At step 103, a display picture is generated according to the static picture data and displayed.

In the embodiment, after receiving the corresponding static picture data through the first transmission channel and storing other static picture data locally, the virtual reality device may directly call the static picture data from the virtual reality device locally and generate the display picture according to the static picture data for displaying.

For example, the virtual reality device receives a frame of static picture data of static trees through the first transmission channel and stores it in the device locally, when the pose information is unchanged (e.g., pose information A), the virtual reality device directly calls the static picture data of the static trees locally and generates a display picture of the static trees for displaying. When the pose information changes to B, the virtual reality device transmits the pose information B to the target device, and receives a frame of static picture data of a static lawn and stores it in the device locally. The virtual reality device directly calls the static picture data locally and generates a display picture of the static lawn for displaying.

It is understood that the wireless transmission limits data transmission amount and thereby limits the picture resolution due to the limitation of the bandwidth, failing to meet the high-resolution requirements of the virtual reality. In the embodiment, the static picture data is transmitted through the first transmission channel and stored in the virtual reality device locally, thereby the static picture data can be directly called locally without transmitting in real time when used, which decreases the data amount of the wireless transmission and reduces the transmission bandwidth. For example, the virtual reality device needs to display 10 frames, in the embodiment 1 frame with higher resolution may be transmitted, stored locally, and called, thereby improving the resolution of the virtual reality.

It should be noted that the display method of the virtual reality device of the embodiment of the present disclosure is not only limited to the wireless transmission, but can also reduce the data amount of transmission for the wired transmission.

The method for displaying a virtual reality scene of the embodiment of the present disclosure acquires pose information of a user through a virtual reality device and transmits the pose information to a target device. The virtual reality device receives static picture data corresponding to the pose information transmitted by the target device through a first transmission channel and stores the static picture data, and generates a display picture according to the static picture data and displaying the display picture. Hence, the virtual reality device receives static picture data through the first transmission channel and stores it in the device locally for calling, which decreases the data amount of the wireless transmission, reduces the transmission bandwidth, and improves the resolution of the virtual reality.

Based on the above embodiments, the case where the virtual reality device receives dynamic picture data will be illustrated below.

Figure 2:
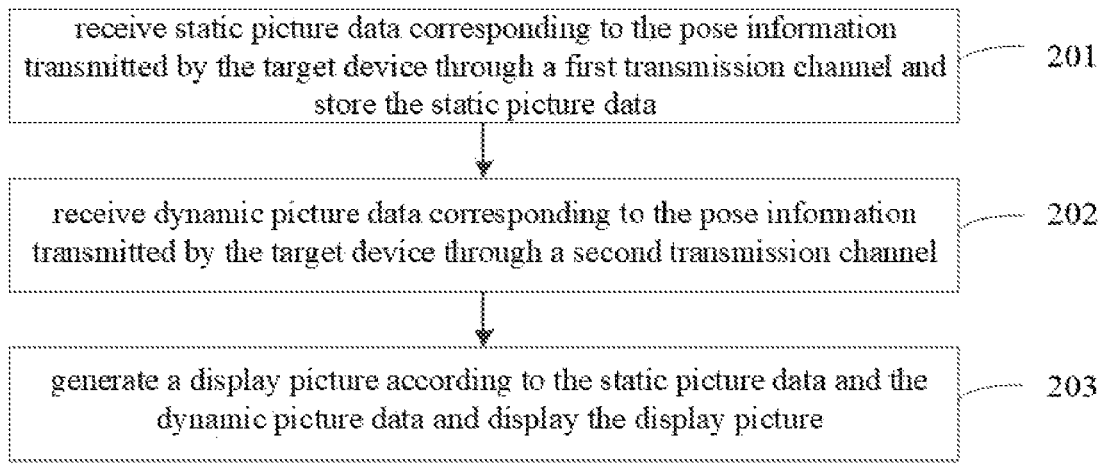
FIG. 2 is a schematic flow chart of another method for displaying a virtual reality scene provided by an embodiment of the present disclosure.

FIG. 2 is a schematic flow chart of another method for displaying a virtual reality scene provided by an embodiment of the present disclosure. As shown by FIG. 2, the method comprises performing the following steps after acquiring pose information of a user and transmitting the pose information to a target device.

At step 201, static picture data corresponding to the pose information transmitted by the target device is received through a first transmission channel and stored.

In an embodiment of the present disclosure, the target device may further transmit other static picture data to a virtual reality device after transmitting static picture data corresponding to the pose information to the virtual reality device. The virtual reality device receives other static picture transmitted by the target device through the first transmission channel and stores it. For example, in the case that pose information A, B, C correspond to static picture data 1, 2, 3 respectively, the target device may further transmit the static picture data 2 and the static picture data 3, as well as the pose information B and the pose information C corresponding to the static picture data 2 and the static picture data 3, to the virtual reality device through the first transmission channel after receiving the pose information A and transmitting the data 1 to the virtual reality device. The virtual reality device receives and stores the static picture data 2 and the static picture data 3 as well as the corresponding pose information B and pose information C.

At step 202, dynamic picture data corresponding to the pose information transmitted by the target device is received through a second transmission channel.

In an embodiment of the present disclosure, the target device may store a correspondence between pose information and dynamic picture data in advance. The target device receives the pose information transmitted by the virtual reality device, acquires corresponding dynamic picture data according to the pose information and the corresponding relation, and transmits the dynamic picture data to the virtual reality device through a second transmission channel.

As an example, pose information A corresponds to N frames of dynamic picture data, the target device transmits the N frames of dynamic picture data to the virtual reality device in sequence through the second transmission channel when receiving the pose information A. That is to say, the second transmission channel transmits dynamic picture data in real time.

In the embodiment, the static picture data may be transmitted through the first transmission channel, the dynamic picture data may be transmitted through the second transmission channel. As a possible implementation, the transmission ways of the first transmission channel and the second transmission channel are wireless transmission.

Figure 3:
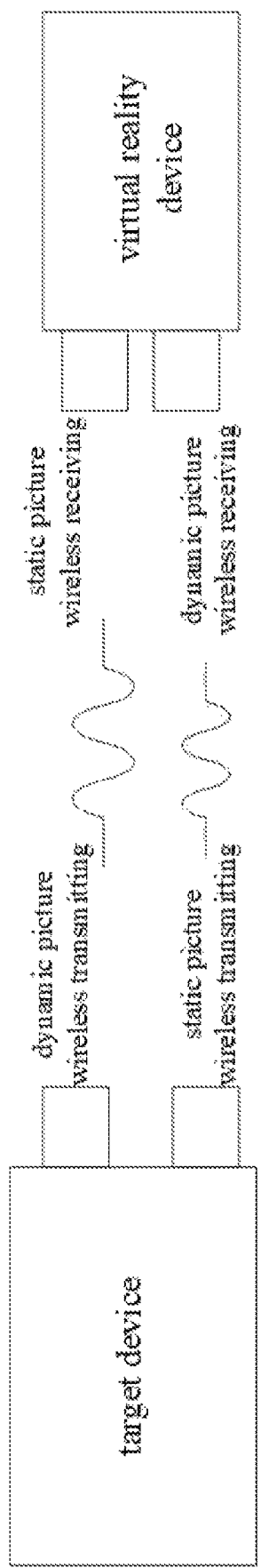
FIG. 3 is a schematic diagram of data transmission provided by an embodiment of the present disclosure.

For example, with reference to FIG. 3, two independent wireless transmission channels are provided, wherein one channel transmits dynamic picture data and the other channel transmits static picture data. A correspondence between pose information and static picture data and dynamic picture data may be stored in the target device in advance. The target device receives pose information transmitted by the virtual reality device, acquires corresponding static picture data and dynamic picture data according to the pose information, and transmits the dynamic picture data and the static picture data to the virtual reality device. The virtual reality device receives the static picture data and the dynamic picture data through respective channels, wherein the static picture data is not transmitted in real time and the dynamic picture data is transmitted in real time, thereby achieving separate transmission of dynamic data and static data.

It should be noted that, the sequence for receiving the static picture data and receiving the dynamic picture data is not limited in the embodiment.

At step 203, a display picture is generated according to the static picture data and the dynamic picture data and displayed.

In the embodiment, the static picture data may be called from the virtual reality device locally, and the dynamic picture data may be received through the second transmission channel in real time. The static picture data and the dynamic picture data are combined by related combination techniques to generate a display picture and display the display picture.

For example, the virtual reality device receives a frame of static picture data of static trees through the first transmission channel and stores it in the device locally, and receives dynamic picture data of birds flying over in real time through the second transmission channel. The virtual reality device directly calls the static picture data of the static trees locally, combines based on the dynamic picture data of birds flying over received in real time, and generates a display picture of birds flying over in the background of the static trees for displaying.

In the method for displaying a virtual reality scene of the embodiment of the present disclosure, the virtual reality device receives the static picture data corresponding to the pose information transmitted by the target device through the first transmission channel and stores the static picture data, receives the dynamic picture data corresponding to the pose information transmitted by the target device through the second transmission channel, and generates the display picture according to the static picture data and the dynamic picture data and displays the display picture. Therefore, the data amount of the wireless transmission is decreased, the transmission bandwidth is reduced, and the resolution of the virtual reality is improved.

In some embodiments of the present disclosure, the virtual reality device may further acquire a user operation instruction and transmit the user operation instruction to the target device. The target device acquires respective dynamic picture data according to the user operation instruction and transmits the dynamic picture data to the virtual reality device through the second transmission channel. Further, the virtual reality device generates the display picture according to the static picture data and the dynamic picture data and displays the display picture.

For example, the user triggers a button through a handle, and the virtual reality device generates an instruction according to the button triggered by the user and transmits the instruction to the target device. The target device acquires respective dynamic picture data according to the instruction and transmits the dynamic picture data to the virtual reality device through the second transmission channel to make the virtual reality device generate the display picture according to the static picture data and the dynamic picture data.

In some embodiments of the present disclosure, after the virtual reality device acquires the pose information of the user, it may be further determined whether the virtual reality device has stored static picture data corresponding to the pose information according to the pose information. If so, the static picture data is called, the display picture is generated according to the static picture data and displayed. If not, the static picture data corresponding to the pose information transmitted by the target device is received through the first transmission channel and stored.

As an example, after acquiring the pose information of the user through the sensor, the virtual reality device may match with the pose information stored in the device locally, and if the same pose information is matched, the corresponding static picture data is directly called locally; otherwise, the static picture data corresponding to the pose information transmitted by the target device is received through the first transmission channel and stored.

As another example, after receiving the pose information, the target device may inquire whether the pose information and corresponding static picture data have been transmitted to the virtual reality device. If so, the static picture data will not be transmitted. If not, the corresponding static picture data is transmitted to the virtual reality device through the first transmission channel.

Therefore, when the user rotates to a same position multiple times, it is not necessary to repeatedly receive the static picture data through the first transmission channel, instead the previously stored static picture data may be called locally according to the pose information, which further decreases the data amount of the wireless transmission.

In order to implement the above embodiments, the present disclosure further provides a apparatus for displaying a virtual reality scene.

Figure 4:
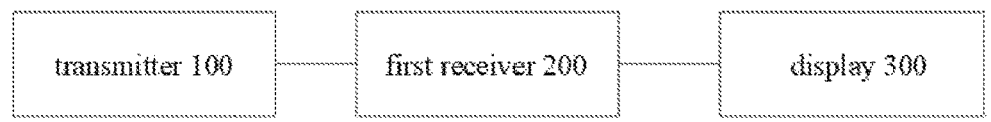
FIG. 4 is a schematic structural diagram of an apparatus for displaying a virtual reality scene provided by an embodiment of the present disclosure.

FIG. 4 is a schematic structural diagram of a apparatus for displaying a virtual reality scene provided by an embodiment of the present disclosure. As shown by FIG. 4, the apparatus comprises: a transmitter 100, a first receiver 200, and a display 300.

The transmitter 100 is configured to acquire pose information of a user and transmit the pose information to a target device.

The first receiver 200 is configured to receive static picture data corresponding to the pose information transmitted by the target device through a first transmission channel and store the static picture data.

The display 300 is configured to generate a display picture according to the static picture data and display the display picture.

Figure 5:
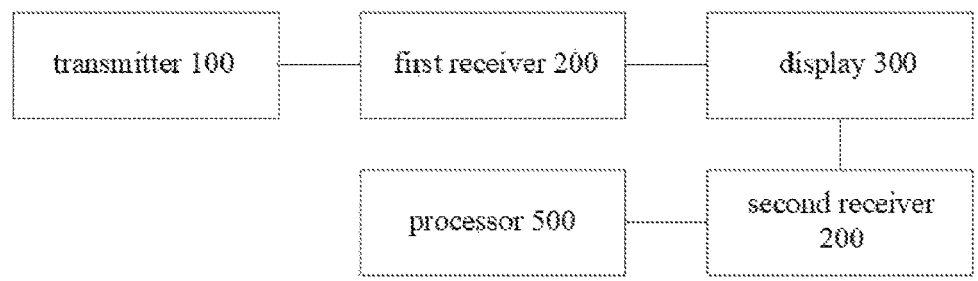
FIG. 5 is a schematic structural diagram of another apparatus for displaying a virtual reality scene provided by an embodiment of the present disclosure.

On the basis of FIG. 4, the apparatus shown by FIG. 5 further comprises a second receiver 400 and a processor 500.

The second receiver 400 is configured to receive dynamic picture data corresponding to the pose information transmitted by the target device through a second transmission channel; the display 300 is configured to generate a display picture according to the static picture data and the dynamic picture data and display the display picture.

The processor 500 is configured to determine whether static picture data corresponding to the pose information has been stored according to the pose information; if so, call the static picture data.

The first receiver 200 is further configured to receive other static picture data transmitted by the target device through the first transmission channel and store it.

The transmitter 100 is further configured to acquire a user operation instruction and transmit the user operation instruction to the target device; the second receiver 400 is further configured to receive dynamic picture data corresponding to the user operation instruction through the second transmission channel; the display 300 is configured to generate a display picture according to the static picture data and the dynamic picture data and display the display picture.

In the example shown in FIG. 5, the first receiver 200 and the second receiver 400 are shown as separate receivers. However, those skilled in the art will appreciate that the first receiver 200 and the second receiver 400 can be implemented by the same receiver.

Those skilled in the art will appreciate that the transmitter and receiver can be implemented by hardware known in the art. For example, the transmitter and the receiver can be implemented by an FPGA or an ASIC, which is not limited in this disclosure. The display can be any of a variety of displays known in the art, including, for example, liquid crystal displays, which are not limited in this disclosure. The processor may be a general purpose processor or a dedicated processor, which is not limited in this disclosure.

It should be noted that the illustration of the method for displaying a virtual reality scene by the foregoing embodiments also applies to the apparatus for displaying a virtual reality scene of the present embodiment, which is not repeatedly described here.

The apparatus for displaying a virtual reality scene of the embodiment of the present disclosure acquires the pose information of the user through the virtual reality device and transmits the pose information to the target device. The virtual reality device receives the static picture data corresponding to the pose information transmitted by the target device through the first transmission channel and stores the static picture data, and further generates the display picture according to the static picture data and displays the display picture. Thus, the virtual reality device receives the static picture data through the first transmission channel and stores it in the device locally for calling, which decreases the data amount of the wireless transmission, reduces the transmission bandwidth, and improves the resolution of the virtual reality.

In order to implement the above embodiments, the present disclosure further provides a virtual reality device comprising the apparatus for displaying a virtual reality scene according to any of the foregoing embodiments.

In order to implement the above embodiments, the present disclosure further provides an electronic device comprising a processor and a memory, wherein the processor runs programs corresponding to executable program codes stored in the memory by reading the executable program codes for implementing the method for displaying a virtual reality scene according to any of the foregoing embodiments.

In order to implement the above embodiments, the present disclosure further provides a computer program product, when instructions in the computer program product are performed by a processor, the method for displaying a virtual reality scene according to any of the foregoing embodiments is implemented.

In order to implement the above embodiments, the present disclosure further provides a non-transitory computer-readable storage medium having computer programs stored thereon which, when executed, implement the method for displaying a virtual reality scene according to any of the foregoing embodiments.

Figure 6:
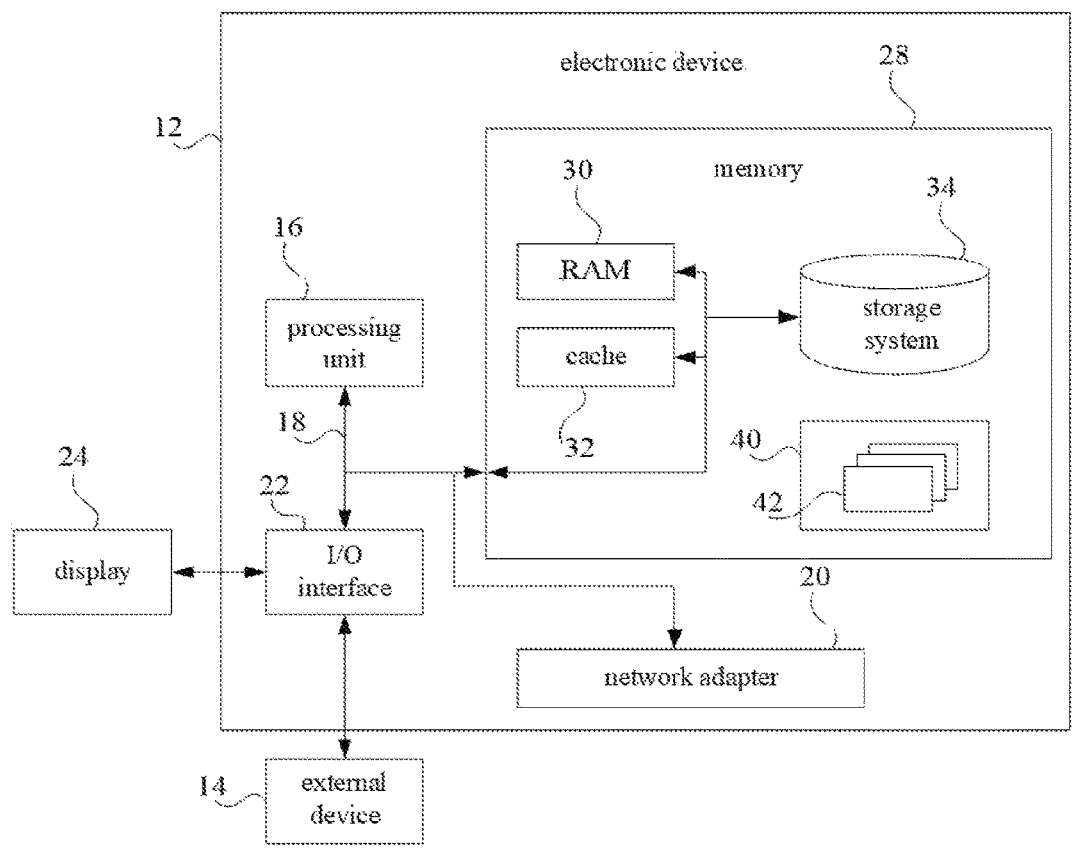
FIG. 6 is a block diagram of an exemplary electronic device suitable for implementing embodiments of the present disclosure.

FIG. 6 shows a block diagram of an exemplary electronic device suitable for implementing the embodiments of the present disclosure. An electronic device 12 shown by FIG. 6 is merely an example, which shall not limit the functions and usage of the embodiments of the present disclosure.

As shown in FIG. 6, the electronic device 12 is embodied in the form of a general-purpose computing device. Components of the electronic device 12 may include, but are not limited to, one or more processors or processing units 16, a system memory 28, a bus 18 connecting different system components (including the system memory 18 and the processing unit 16).

The bus 18 represents one or more of several types of bus structures, including a memory bus or memory controller, a peripheral bus, an accelerated graphics port, a processor, or a local bus using any of a plurality of bus structures. For example, these architectures include, but are not limited to, Industry Standard Architecture (ISA) bus, Micro Channel Architecture (MCA) bus, Enhanced ISA bus, Video Electronics Standards Association (VESA) local bus, and Peripheral Component Interconnects (PCI) bus.

The electronic device 12 typically comprises a plurality of computer system readable media. These media may be any available medium that can be accessed by the electronic device 12 including volatile and non-volatile media, removable and non-removable media.

The memory 28 may comprise a computer system readable medium in the form of a volatile memory, such as a random access memory (RAM) 30 and/or a cache memory 32. The electronic device 12 may further comprise other removable/non-removable, volatile/non-volatile computer system storage medium. By way of examples only, a storage system 34 may be used for reading from and writing to a non-removable, non-volatile magnetic medium (not shown in FIG. 6, generally referred as a "hard disk drive"). While it isn't shown in FIG. 6, a magnetic disk drive for reading from and writing to removable, non-volatile magnetic disks (e.g., "floppy disks") and a optical disk drive for reading from and writing to removable, non-volatile optical disks (e.g., compact disc read only memories (CD-ROMs), digital video disc read only memories (DVD-ROMs) or other optical media) may be provided. In these cases, each drive may connect with the bus 18 via one or more data medium interfaces. The memory 28 may comprise at least one program product with a set of (e.g., at least one) program modules configured to perform functions of each embodiment of the present application.

A program/utility tool 40 with a set of (at least one) program modules 42 may be stored in, for example, the memory 28, such program modules 42 including but not limited to operation systems, one or more applications, other program modules and program data, each of or a combination of such examples may include implementation of network environment. The program modules 42 usually perform functions and/or methods in the embodiments described by the present application.

The electronic device 12 may also communicate with one or more external devices 14 (e.g., a keyboard, a pointing device, a display 24, etc.), may also communicate with one or more devices that enable users to interact with the computer system/server 12, and/or communicate with any device that enables the computer system/server 12 to communicate with one or more other computing devices (e.g., a network card, a modem, and the like). Such communication may take place via a input/output (I/O) interface 22. Moreover, the electronic device 12 may further communicate with one or more networks (e.g., a local area network (LAN), a wide area network (WAN), and/or a public network such as the Internet) via a network adapter 20. As shown in the figure, the network adapter 20 communicates with other modules of the electronic device 12 via the bus 18. It should be understood that, while it is not shown in the figure, other hardware and/or software modules may be used in conjunction with the electronic device 12, including but not limited to: microcodes, device drives, redundant processing units, external magnetic disk drive arrays, RAID systems, tape drives, and data backup storage systems, etc.

The processing unit 16 performs various functional applications and data processing, for example, implements the methods mentioned in the foregoing embodiments, by running programs stored in the system memory 28.

In the description of the present disclosure, it should be understood that terms "first" and "second" are used for illustrative purpose only, and should not be construed as indicating or suggesting relative importance or implicitly illustrating the number of the indicated technical features. Therefore, a feature defined by "first", "second" may explicitly or implicitly comprises at least one said feature. In the description of the present disclosure, "a plurality of" means at least two, such as two, three, etc., unless explicitly and specifically defined otherwise.

In the description of the present specification, referring to terms "an embodiment", "some embodiment", "an example", "a specific example", or "some examples" means specific features, structures, materials, or characteristics described in connection with that embodiment or example are included in at least one embodiment or example of the present disclosure. In the present specification, schematic representations of the above terms are not necessarily directed to the same embodiment or example. Moreover, the specific features, structures, materials, or characteristics described may be combined characteristics described may be combined in a suitable manner in any one or more embodiments or examples. In addition, those skilled in the art can incorporate and combine different embodiments or examples and their features described in the specification without mutually conflicting.

While the embodiments of the present disclosure have been shown and described above, it is understood that the foregoing embodiments are exemplary and are not to be construed as limiting the present disclosure. Changes, modifications, replacements and variations may be made to the above embodiments by those of ordinary skill in the art within the scope of the present disclosure.

What is claimed is:

1. A method for displaying a virtual reality scene, comprising:
    acquiring pose information of a user and transmitting the pose information to a target device;
    determining whether static picture data corresponding to the pose information has been stored according to the pose information; and
    if so, calling the static picture data, generating the display picture according to the static picture data and displaying the display picture,
    if not, receiving static picture data corresponding to the pose information transmitted by the target device through a first transmission channel and storing the static picture data, generating a display picture according to the static picture data and displaying the display picture.

2. The method according to claim 1, wherein the method further comprises, before generating the display picture according to the static picture data and displaying the display picture:
    receiving dynamic picture data corresponding to the pose information transmitted by the target device through a second transmission channel;
    wherein the generating the display picture according to the static picture data and displaying the display picture comprises:
    generating the display picture according to the static picture data and the dynamic picture data and displaying the display picture.

3. The method according to claim 1, wherein the method further comprises, after receiving the static picture data corresponding to the pose information transmitted by the target device through the first transmission channel:
    receiving other static picture data transmitted by the target device through the first transmission channel and storing other static picture data.

4. The method according to claim 1, further comprising:
    acquiring a user operation instruction and transmitting the user operation instruction to the target device;
    receiving dynamic picture data corresponding to the user operation instruction through a second transmission channel;
    wherein the generating the display picture according to the static picture data and displaying the display picture comprises:
    generating the display picture according to the static picture data and the dynamic picture data and displaying the display picture.

5. The method according to claim 1, wherein the pose information of the user comprises at least one of: a position, orientation, or head elevation.

6. An electronic device, comprising:
    a memory that stores executable program codes; and
    a processor configured to run programs corresponding to the executable program codes stored in the memory by reading the executable program codes for implementing the method for displaying a virtual reality scene according to claim 1.

7. A non-transitory computer-readable storage medium having computer programs stored thereon which, when executed by a processor, implement the method according to claim 1.

8. An apparatus for displaying a virtual reality scene, comprising:
    a transmitter configured to acquire pose information of a user and transmit the pose information to a target device;
    a processor configured to determine whether static picture data corresponding to the pose information has been stored according to the pose information, and if so, call the static picture data;
    a first receiver configured to receive static picture data corresponding to the pose information transmitted by the target device through a first transmission channel and store the static picture data when it is determined by the processor that the static picture data corresponding to the pose information has not been stored; and
    a display configured to generate a display picture according to the static picture data and display the display picture.

9. The apparatus according to claim 8, further comprising a second receiver configured to receive dynamic picture data corresponding to the pose information transmitted by the target device through a second transmission channel;
    wherein the display is configured to generate the display picture according to the static picture data and the dynamic picture data and display the display picture.

10. The apparatus according to claim 8, the first receiver is further configured to:
    receive other static picture data transmitted by the target device through the first transmission channel and store other static picture data.

11. The apparatus according to claim 8, wherein the transmitter is further configured to acquire a user operation instruction and transmit the user operation instruction to the target device; and further comprising:
    a second receiver configured to receive dynamic picture data corresponding to the user operation instruction through a second transmission channel; and
    wherein the display is configured to generate the display picture according to the static picture data and the dynamic picture data and display the display picture.

12. The apparatus according to claim 8, wherein the pose information of the user comprises at least one of: a position, orientation, or head elevation.

13. A virtual reality device comprising the apparatus according to claim 8.

* * * * *